United States Patent [19]
Grissen et al.

[11] Patent Number: 4,826,306
[45] Date of Patent: May 2, 1989

[54] COMPACT REAR VIEW MIRROR FOR SMALL VEHICLES

[75] Inventors: David J. Grissen, Farmington, Conn.; Jeffrey C. Comfort, Walnut Creek, Calif.

[73] Assignee: Mirror Image, Longwood, Fla.

[21] Appl. No.: 121,235

[22] Filed: Nov. 16, 1987

[51] Int. Cl.$^4$ .............................................. G02B 5/10
[52] U.S. Cl. .................... 350/632; 248/476; 350/606
[58] Field of Search ............... 350/604, 606, 631, 632, 350/635, 638; 248/475.1, 476

[56] References Cited

U.S. PATENT DOCUMENTS

| | | | |
|---|---|---|---|
| D. 247,292 | 2/1978 | Brown | 350/606 |
| 516,910 | 3/1894 | Bucherer | 350/606 |
| 3,981,567 | 9/1976 | Cululi et al. | 350/632 |
| 3,995,945 | 12/1976 | Addicks | 350/632 |
| 4,054,375 | 10/1977 | Ribeca | 350/606 |
| 4,135,788 | 1/1979 | Sargis | 350/632 |
| 4,326,774 | 4/1982 | Beigl | 350/632 |
| 4,359,266 | 11/1982 | Rohlf et al. | 350/604 |
| 4,433,899 | 2/1984 | Sellet et al. | 350/635 |
| 4,603,944 | 8/1986 | Greenlaw et al. | 350/638 |
| 4,605,289 | 8/1986 | Levine et al. | 350/606 |

FOREIGN PATENT DOCUMENTS

| | | | |
|---|---|---|---|
| 228441 | 3/1958 | Australia | 350/606 |
| 8202433 | 7/1982 | PCT Int'l Appl. | 350/606 |

Primary Examiner—John K. Corbin
Assistant Examiner—Martin Lerner
Attorney, Agent, or Firm—Douglas A. Chaikin

[57] ABSTRACT

A compact wide angle rear view mirror mountable on a handlebars of a small vehicles includes a convex reflecting surface held in a frame having straps for fastening the frame to the handlebars.

11 Claims, 2 Drawing Sheets

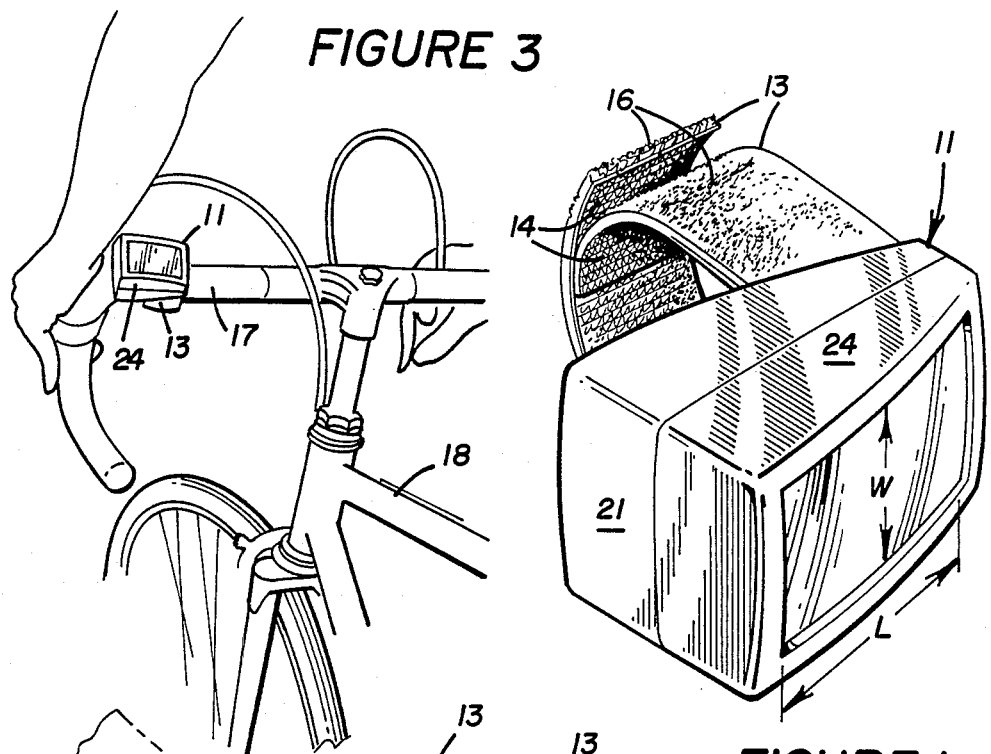
FIGURE 3
FIGURE 1
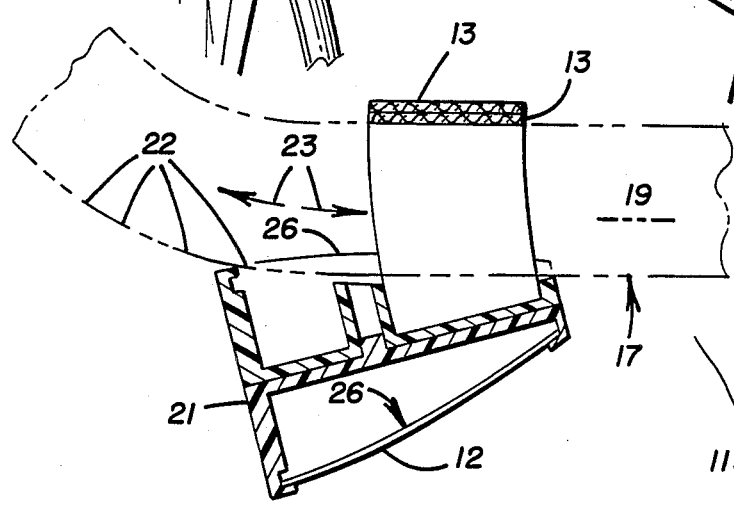
FIGURE 2
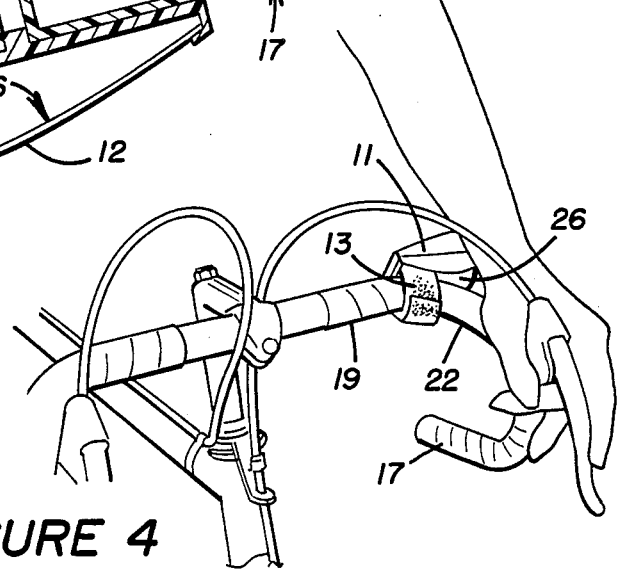
FIGURE 4

COMPACT REAR VIEW MIRROR FOR SMALL VEHICLES

BACKGROUND OF THE INVENTION

1. Field of the Invention

This invention relates rear view mirrors for small vehicles and more particularly to a compact rear view mirror adapted for mounting on a handlebar of a small vehicle.

2. Description of the Prior Art

The features of a rear view mirror for bicycles (or other small vehicles) most desired by bicyclists are adequacy of the rear viewing angle, light weight and low wind resistance. The mirror should not extend outside the envelope of the bicyclist riding the bicycle. The envelope of the bicyclist is defined by the outstretched arms of the rider, his head and his trunk. Additionally, the mirror should not extend beyond the frame and handlebars of the bicycle when it is not being ridden.

One of the more common types of rear view mirrors for bicyclists are small clip-on mirrors clipped or fastened to glasses frames or helmets worn by the bicyclist. Helmets must be worn to use these types of rear view mirrors. This class of rear view mirrors for bicycles, being mounted at eye level, must extend outside the bicyclist's envelope in order to provide an adequate rear viewing angle. Such clip-on mirrors can be quite distracting to the bicyclist and are easily knocked askew.

Another very common class of bicycle rear view mirrors are typically reflecting surfaces secured at the distal end of an arm extending from either the bicycle handlebar or, in some cases the frame of the bicycle. This latter category of rear view mirrors for bicycles also extend beyond the envelope of the bicyclist when he is riding so that an adequate rear viewing angle is provided. Such mirrors typically increase wind resistance. Additionally, since such mirrors are located at the end of an extending arm, they are vulnerable of being knocked out of adjustment, especially at times when the bicycle is not being ridden i.e., when the bike is parked or being transported. Such mirrors mounted on the distal end of an extending arm also complicate handling of the bicycle in storage and during transport.

Other rear view mirrors include those that attach to a bicyclist's wrist.

SUMMARY OF THE INVENTION

It is a general object of this invention is to provide a compact rear-view mirror which is used in conjunction with a small vehicle having handle bars or similar structure.

Another object of this invention is to provide a compact rear-view mirror which has a broad rear viewing field of view.

Another object of this invention is to provide a compact rear-view mirror which does not easily lose its adjustment when being ridden or being stored or transported.

Another object of this invention is to provide a compact rear-view mirror which is easy to install and adjust.

In accordance with the above objects, a rear view mirror for small vehicles having handlebars in accordance with this invention includes a frame having a trapezoidal like cross-section in a horizontal plane and a rectangular like cross-section in a vertical plane, one of its rectangular surfaces being convex and light reflecting; and means for securing the frame to the handlebars, the frame being inclined relative to both a vertical and a horizontal axis on the handle bars, whereby, the reflecting surface can be adjusted to various reflecting angles about its horizontal axis by rotating the frame around the handlebars and to various reflecting angles about its vertical axis by moving the frame along the handlebars.

Particular inventive features of the rear view mirror relate to the broad field of view created by the reflecting rectangular surface and to the triangular like configuration of the frame holding the reflective surface which cooperate with the handlebar of the small vehicle to provide a rear view mirror especially well adapted for the bicyclist.

Other inventive aspects of the described rear view mirror for bicycles relate to its compactness, and to the fact that it can be easily secured and removed from any type of bicycle.

Particular advantages of the invented rear view mirror for bicycles derived from its wide rear viewing angle, light weight and low wind resistance. The invented rear view mirror is essentially no wider than the diameter of the handlebar and does not extend outside the envelope of the bicyclist when he is riding the bike nor beyond the perimeter of the bicycle handlebar. The viewing angle of the mirror is easily adjustable on the handlebar and is not sensitive to a change of the rider's head position.

Other features, aspects, advantages and objects presented and accomplished by the invented rear view mirror for bicycles will become apparent and/or be more fully described and understood with reference to the following detail description and drawings.

BRIEF DESCRIPTION OF THE DRAWINGS

FIG. 1 is a perspective view of an embodiment of the invented rear view mirror for bicycles.

FIG. 2 is a cross-sectional illustration showing the angular relationship between the triangular configuration of the frame structure, the bicycle handlebar curvature and the reflective surface.

FIG. 3 is a perspective view of the embodiment of the rear view mirror shown in FIG. 1 strapped to the handlebar of a bicycle viewed from the rear.

FIG. 4 is a perspective view of the embodiment of the rear view mirror shown in FIG. 1 strapped onto the handlebar of a bicycle viewed from the front.

DETAILED DESCRIPTION OF PREFERRED EMBODIMENTS

Figure 8:
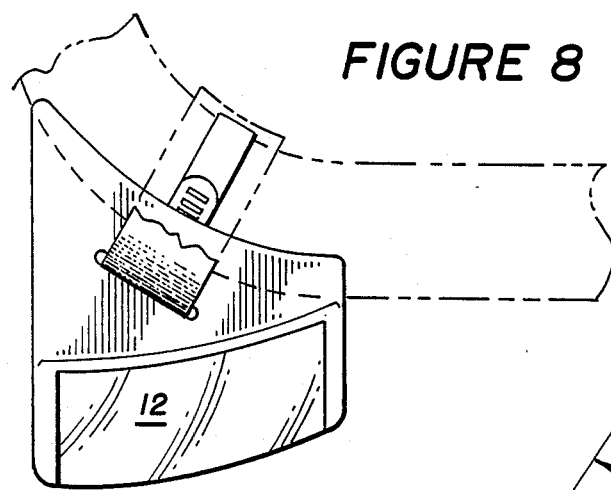
FIG. 8 is a top plan view of the embodiment of the invented rear view mirror for bicycles shown in FIG. 7.

The invention will now be described with reference to the drawing wherein like referenced characters designate like or corresponding parts throughout the several views. With particular reference to FIG. 1, there is shown the first embodiment of the rear view mirror for small vehicles in accordance with the invention designated by the numeral 10. The rear view mirror 10 includes a frame 11, a reflective surface 12 and a pair of fastening straps 13 each strap having a hooked surface 14 and a fibrous surface 16. The frame 11 is preferably molded. When pressed together the fibrous surface 16 captures the small hooks forming the hooked surface 14. The fastening means for the straps are commonly available under the tradename VELCRO.

As illustrated in FIGS. 3 and 4, the invented rear view mirror is secured by the fastening straps 13 around the handlebar 17 of a bicycle 18. As shown, the invented mirror 10 is located on the left handlebar. Since the frame 11 is symmetrical in the horizontal plane, the invented mirror could be just as easily mounted on the right handlebar 17 of the bicycle 18 by simply turning the rear view mirror 10.

Referring to FIG. 2, the frame 11 can be moved back and forth along the horizontal section 19 of the handlebar 17 such that a base 21 of the frame 11 engages the curved section 22 of the handlebar 17. By moving the frame 11 back and forth in the directions indicated by the arrows 23, the angle 39 at which the reflective surface 12 makes with the axis of the horizontal section 19 of the handlebar 17 can be adjusted.

Figure 5:
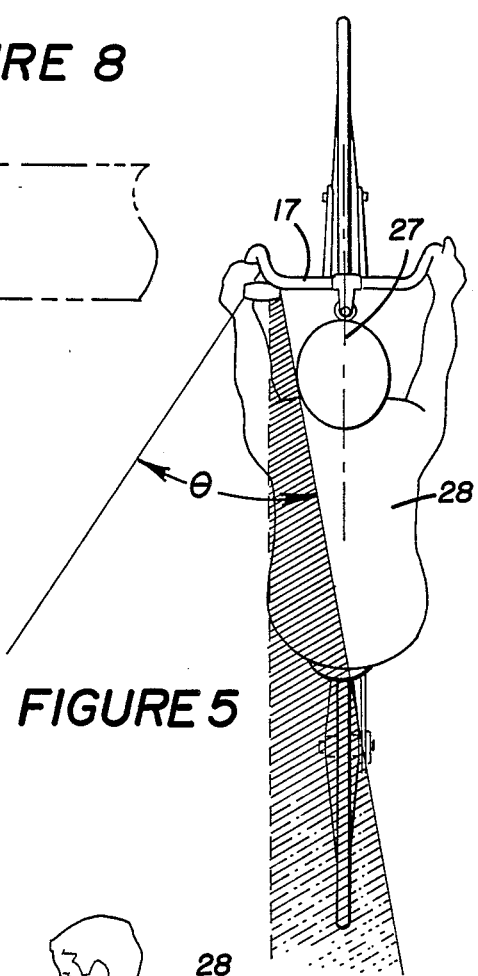
FIG. 5 is a top plan view of a bicyclist on a bicycle illustrating the rear view angle provided by the invented mirror in a horizontal plane.

More particularly, referring to FIGS. 1 and 2, the base 2 of the frame is rectangular. The sides 24 of the frame 11 are trapezoidal and the back and front faces 26 are again rectangular. Thus, the frame 11 has a trapezoidal cross-sectional configuration in the horizontal plane and a rectangular cross-sectional configuration in a vertical plane. As illustrated in FIG. 2, the fastening straps 13 are secured to the frame at its apex such that when wrapped around the handlebar 17 of the bicycle 18, they resiliently urge the base 21 of the frame into engagement with the surface of the handlebar 17. The base of the frame 11 being larger than its top inclines the reflective surface relative to both the axis of the horizontal section 19 of the handlebar and the axis 27 of the rolling plane of the bicycle (see FIG. 5). The rolling plane is defined as the surface plane in which the bike is moving while the rider is aboard.

Figure 6:
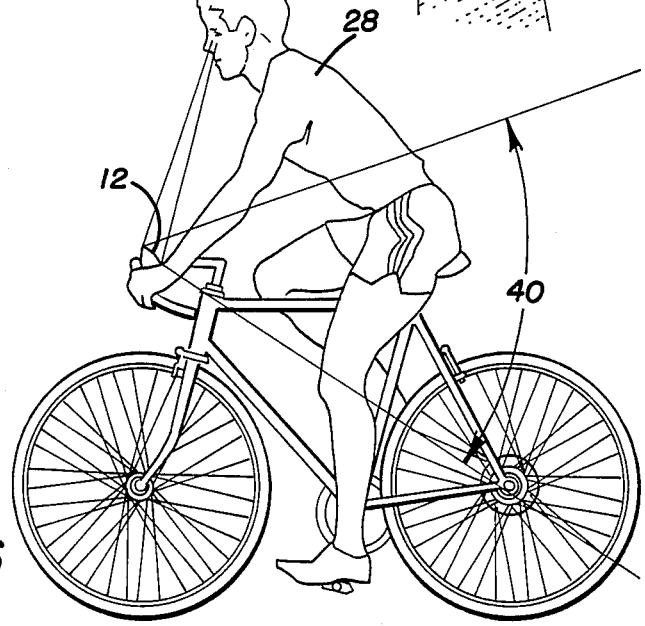
FIG. 6 is a side elevation view of a bicyclist on a bicycle illustrating the rear viewing angle provided by the mirror in a vertical plane.

Referring now to FIGS. 3 and 6, the frame 11 holding the reflective surface 12 also may be rotated above the axis of the horizontal section 19 of the handlebar 17 such that the reflective surface 12 is angled upwardly toward the eye of the bicyclist 28.

Figure 7:
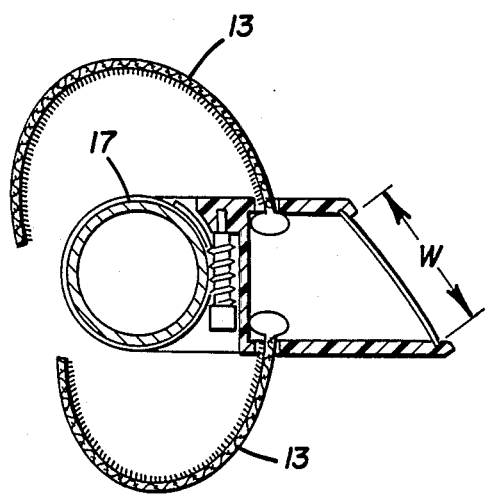
FIG. 7 is a cross-sectional illustration showing the framework of an alternative embodiment of the invented rear view mirror.

As shown by the embodiment illustrated in FIGS. 7 and 8, the upward inclination of the reflective surface 12 can be accomplished utilizing a frame 29 having a right triangular like cross-sectional configuration in a vertical plane with the reflecting surface 12 forming the hypotenuse. In the case, this bottom surface 31 of the frame 29 is in the form of a trapazoid with the larger base again extending to the outside such that the reflecting surface 12 is inclined angularly toward the rolling plane 27 of the bicycle 18.

A circular clamp 30 secures the triangular frame 29 to the horizontal section 19 of the bicycle handlebar 17. A conventional threaded screw 33 and cooperative nut 34 close the clamp around the handlebar section 19 securing the frame 29 thereto as illustrated in FIG. 7. The fastening straps 13 are used cooperatively with the clamp 30. Once the correct rear viewing angle is found the clamp 30 is tightened for a semipermanent adjustment. Additionally, the clamp 30 provides additional security against the mirror 10 being stolen.

With reference to FIGS. 2, 5, 6 and 7, the radius of curvature of the convex reflective surface is determined with reference to the desired rear viewing angle in the horizontal plane and in the vertical plane. The horizontal rear viewing angle 39 set in the horizontal plane is partially obstructed by the body of the bicyclist 27 indicated by the shaded area 36 in FIG. 5. The unobstructed horizontal rear viewing angle in the horizontal plane should intersect the rolling plane not more than five (5) feet behind the bicyclist.

The desired rear viewing angle 40 for the vertical plane also must be considered in determining the radius of curvature of the reflecting surface 12. The vertical rear viewing angle 40 intersects the ground plane 37 on which the bicycle is rolling not more than five (5) feet behind the bicyclist as shown in FIG. 6.

The actual field of view obtained by the convex reflecting surface not only depends upon the radius of curvature of the surface, but also the length and width of the rectilinear reflecting segment of the convex surface. The width of the surface should be chosen such that an object standing two feet in height on the ground plane five feet behind the bicycle can be seen completely by the bicyclist when riding on the bicycle. The length of the reflecting surface should be chosen such that the bicyclist can see an object at least a foot wide at an elevation of one foot above the ground plane 37.

It is estimated that the convex reflecting surface 12 is two (2) inches in length and one and quarter ($1\frac{1}{4}$) inches wide. The radius of curvature has not been empirically determined except for the criteria set forth herein.

As illustrated by the drawing, neither the frame 11 nor the frame 29 of the respective embodiments of the invented rear view mirror for bicycles project beyond the envelope defined by the bicyclist when riding the bicycle (FIG. 5) and do not extend inconveniently beyond the perimeter of the unridden bicycle. Accordingly, the invented rear view mirror will not complicate handling or storage of the bicycle. Since the rear viewing mirrors have a width not substantially greater than the diametric width of the handlebar, they do not significantly increase wind resistance of the cyclist. Since the invented rear view mirror is adapted to be secured to a horizontal section of the bicycle or other small vehicle handlebar 17, the invented rear view mirror can be mounted on almost any type of bicycle or small vehicle. In fact, it is not absolutely necessary that the mirror be secured to a horizontal section of the bicycle handlebar, it can be secured to any straight or partially curved section of the handlebar.

The invented rear view mirror for bicycles has been described in context of two preferred embodiments. Many modifications and variations can been made to the invented rear view mirror for bicycles which, while not described herein, fall within the spirit and the scope of the invention as described in the appended claims.

What is claimed is:

1. A rear view mirror for small vehicles having handlebars, comprising in combination:
   a frame having a trapezoidal like cross-section in a horizontal plane and a rectangular like cross-section in a vertical plane, one of its rectangular surfaces being convex and light reflecting, the convex reflecting surface is rectilinear; and
   means for securing the frame to the handlebars oriented with its apex pointing toward the small vehicle with the reflecting surface inclined relative to both a vertical and a horizontal axis, whereby, the reflecting surface can be adjusted to various reflecting angles about its horizontal axis by rotating the frame around the handlebars and to various reflecting angles about its vertical axis by moving the frame along the handlebars utilizing curvature of the handlebars.

2. A rear view mirror in accordance with claim 1 wherein the means for securing the frame to the handlebars comprises a pair of straps fastened to the frame proximate its trapezoidal apex, a first strap presenting a surface on one face of minute hooks, the remaining second strap presenting a fibrous surface on one face which upon being pressed into the hooked surface of the first strap captures the minute hooks.

3. A rear view mirror in accordance with claim 1 wherein the means for securing the frame to the handlebars comprises a circular clamp having a diameter less than that of the handlebars secured to the frame and extending from the frame from a surface opposite the reflecting surface and means for clamping the circular clamp around the handlebars.

4. A rear view mirror in accordance with claim 1 wherein the surface of the frame opposite the reflective surface is rectilinear and has width at most equal to a diameter of a conventional handlebars.

5. A rear view mirror in accordance with claim 1 wherein the convex reflecting surface has sufficient vertical width to provide a rear viewing angle to a bicyclist riding a bicycle of at least 45 degrees in a horizontal plane parallel to that on which the bicycle rolls.

6. A rear view mirror in accordance with claim 1 wherein the convex reflecting surface has a vertical width of approximately 1¼ inches.

7. A rear view mirror in accordance with claim 1 wherein the convex reflecting surface has horizontal length of 2 inches.

8. A rear view mirror in accordance with claim 1 wherein the convex reflecting surface is rectilinear.

9. A rear view mirror in accordance with claim 8 wherein the convex reflecting surface has sufficient horizontal length to provide a rear viewing angle to a bicyclist riding the bicycle of a least 45 degrees in a horizontal plane parallel to that on which the bicycle rolls.

10. A rear view mirror in accordance with claim 8 wherein the frame is hollow and has an opening shaped to receive the reflecting surface, and further including means for securing the reflecting surface in the opening provided in the frame.

11. A rear view mirror in accordance with claim 8 wherein the first strap presents fibrous surface on its remaining face and the second strap presents a surface of small hooks on its remaining face, the straps encircling the handlebars and overlapping with a fibrous surface of one strap capturing the small hooks of the other strap.

* * * * *